US010968977B2

(12) United States Patent
Ishibashi et al.

(10) Patent No.: US 10,968,977 B2
(45) Date of Patent: Apr. 6, 2021

(54) TORSIONAL VIBRATION DAMPER

(71) Applicants: TOYOTA JIDOSHA KABUSHIKI KAISHA, Toyota (JP); AISIN AW CO., LTD., Anjo (JP); AISIN AW INDUSTRIES CO., LTD., Echizen (JP)

(72) Inventors: Masayuki Ishibashi, Numazu (JP); Hideyuki Nishida, Sunto-gun (JP); Isamu Hachisuwa, Nagoya (JP); Yoichi Oi, Anjo (JP); Takuya Yoshikawa, Fukui (JP); Ryosuke Otsuka, Sabae (JP); Katsunori Tanaka, Fukui (JP); Tomoyuki Hiramoto, Sabae (JP)

(73) Assignees: TOYOTA JIDOSHA KABUSHIKI KAISHA, Toyota (JP); AISIN AW CO., LTD., Anjo (JP); AISIN AW INDUSTRIES CO., LTD., Echizen (JP)

( * ) Notice: Subject to any disclaimer, the term of this patent is extended or adjusted under 35 U.S.C. 154(b) by 0 days.

(21) Appl. No.: 16/799,893

(22) Filed: Feb. 25, 2020

(65) Prior Publication Data
US 2020/0278008 A1    Sep. 3, 2020

(30) Foreign Application Priority Data
Feb. 28, 2019 (JP) .............................. JP2019-035234

(51) Int. Cl.
*F16F 15/12* (2006.01)
*F16F 15/121* (2006.01)

(52) U.S. Cl.
CPC ...... *F16F 15/1206* (2013.01); *F16F 15/1216* (2013.01)

(58) Field of Classification Search
CPC .......................... F16F 15/1206; F16F 15/1216
See application file for complete search history.

(56) References Cited

U.S. PATENT DOCUMENTS

| 2011/0195793 | A1* | 8/2011 | Takeshita | ................. F16F 7/02 464/7 |
| 2018/0149232 | A1* | 5/2018 | Yoshikawa | ........... F16F 15/134 |
| 2018/0283490 | A1* | 10/2018 | Nakamura | .......... F16F 15/1392 |
| 2019/0264773 | A1 | 8/2019 | Yoshikawa et al. | |

FOREIGN PATENT DOCUMENTS

JP          2018-71624 A      5/2018

\* cited by examiner

*Primary Examiner* — Justin Holmes
(74) *Attorney, Agent, or Firm* — Oblon, McClelland, Maier & Neustadt, L.L.P.

(57) ABSTRACT

A torsional vibration damper whose vibration damping performance will not be reduced in a high speed range. In the torsional vibration damper, a planetary gear is oscillated within a first oscillating range when a torsional torque is smaller than a reference torque, and within a second oscillating range when the torsional torque is greater than the reference torque. Each backlash between the pinion gear and at least one of a sun gear and a ring gear within the second oscillating range is individually wider than each backlash between the pinion gear and the sun gear and each backlash between the pinion gear and the ring gear within the first oscillating range.

10 Claims, 5 Drawing Sheets

TORSIONAL VIBRATION DAMPER

CROSS REFERENCE TO RELATED APPLICATION

The present disclosure claims the benefit of Japanese Patent Application No. 2019-035234 filed on Feb. 28, 2019 with the Japanese Patent Office, the disclosure of which is incorporated herein by reference in its entirety.

BACKGROUND

Field of the Disclosure

Embodiments of the present disclosure relate to the art of a torsional vibration damper that suppresses torsional vibrations resulting from torque pulse.

Discussion of the Related Art

JP-A-2018-71624 describes an example of a damper device having a planetary gear unit for suppressing torsional vibrations resulting from torque pulse. According to the teachings of JP-A-2018-71624, the planetary gear unit comprises a sun gear, a carrier and a ring gear, and the planetary gear unit is arranged in a torque converter. In the planetary gear unit, the sun gear and the ring gear are connected to each other through springs. In the damper device taught by JP-A-2018-71624, the springs are disposed between a drive member connected to the sun gear and a driven member connected to the carrier so as to damp a torsional vibration caused by the torque pulse. The carrier is connected to a lockup clutch so that a torque of an engine is applied to the carrier through the lockup clutch. The ring gear includes a ring-shaped gear main body, and a pair of annular side plates. An outer diameter and an inner diameter of each of the side plates are substantially identical to those of the ring gear, and the side plates are fixed to side surfaces of the ring gear by a plurality of rivets so that the ring gear serves as an inertial mass. In the damper device taught by JP-A-2018-71624, the carrier and the sun gear are oscillated relatively to each other within a predetermined degree by pulsation of the engine torque while compressing the springs. Consequently, the ring gear is oscillated compulsory, and the torsional vibrations resulting from the pulsation of the engine torque are damped by an inertia torque of the ring gear.

As described, in the torsional vibration damper described in JP-A-2018-71624, the inertia torque of the ring gear acts as a vibration suppression torque to damp the vibration resulting from the pulsation of the engine torque. The inertia torque is governed by an inertia moment and an angular acceleration. Whereas, the engine torque is less likely to be changed in a high speed range, and hence a vibratory force (or torque) resulting from the pulsation of the engine torque is reduced with an increase in a speed of the engine. For this reason, when the engine is operated at a high speed, the inertia torque of the ring gear will be increased greater than the vibratory force resulting from the pulsation of the engine torque. In this situation, the torque derived from an oscillation of the ring gear may act as the vibratory force to reduce vibration damping performance.

SUMMARY

The present disclosure has been conceived noting the above-described technical problems, and it is therefore an object of the present disclosure to provide a torsional vibration damper whose vibration damping performance will not be reduced in a high speed range.

Embodiments of the present disclosure relates to a torsional vibration damper comprising a planetary gear unit that performs a differential action among: a sun gear; a ring gear arranged concentrically around the sun gear; and a carrier supporting a plurality of pinion gears interposed between the sun gear and the ring gear in a rotatable manner. In the planetary gear unit, one of the sun gear, the ring gear, and the carrier serves as an input element to which a torque is delivered from an engine, another one of the sun gear, the ring gear, and the carrier serves as an output element that outputs the torque, and still another one of the sun gear, the ring gear, and the carrier serves as an inertia element that is rotated relatively to the input element and the output element by an inertia force. In the torsional vibration damper, an elastic member is interposed between the input element and the output element to be deformed elastically by a torsional torque causing a relative rotation between the input element and the output element. Each of the pinion gears is individually moved from an initial position when the relative rotation between the input element and the output element is caused by the torsional torque, and individually oscillated by a pulsation of the torque delivered to the input element from the engine. In order to achieve the above-explained objective, according to the exemplary embodiment of the present disclosure, each of the pinion gears is individually oscillated within a first oscillating range when the torsional torque is smaller than a reference torque, and within a second oscillating range when the torsional torque is greater than the reference torque. In addition, each backlash between the pinion gears and at least one of the sun gear and the ring gear within the second oscillating range is individually wider than each backlash between the pinion gears and the sun gear within the first oscillating range, and each backlash between the pinion gears and the ring gear within the first oscillating range.

In a non-limiting embodiment, the second oscillating range may be located ahead of the first oscillating range in a rotational direction of the carrier.

In a non-limiting embodiment, each of the backlashes between the pinion gears and the sun gear within the second oscillating range may be individually wider than each of the backlashes between the pinion gears and the sun gear within the first oscillating range, and each of the backlashes between the pinion gears and the ring gear within the first oscillating range.

In a non-limiting embodiment, each of the backlashes between the pinion gears and the ring gear within the second oscillating range may be individually wider than each of the backlashes between the pinion gears and the sun gear within the first oscillating range, and each of the backlashes between the pinion gears and the ring gear within the first oscillating range.

In a non-limiting embodiment, each of the backlashes between the pinion gears and the sun gear within the second oscillating range and each of the backlashes between the pinion gears and the ring gear within the second oscillating range may be individually wider than each of the backlashes between the pinion gears and the sun gear within the first oscillating range, and each of the backlashes between the pinion gears and the ring gear within the first oscillating range.

In a non-limiting embodiment, the reference torque may be greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

In the torsional vibration damper according to the embodiment of the present disclosure, a torque generated by the engine is applied to the input element connected to the output element through the elastic member. The input member and the output member are rotated relatively to each other while compressing the elastic member by the torsional torque. In this situation, the inertia element is rotated relatively to the input element and the output element while being oscillated by the pulsation of the engine torque. An inertia torque of the inertia element being oscillated acts as a vibration suppression torque to suppress vibrations resulting from the pulsation of the engine torque. As a result of such relative rotation between the input member and the output member, each of the pinion gears is individually displaced in a rotational direction from an initial position while being oscillated by the pulsation of the engine torque.

Specifically, given that the torsional torque is smaller than the reference torque, each of the pinion gears is individually oscillated within the first oscillating range. By contrast, given that the torsional torque is greater than the reference torque, each of the pinion gears is individually oscillated within the second oscillating range. As described, according to the exemplary embodiment of the present disclosure, each of the backlashes between the pinion gears and at least one of the sun gear and the ring gear within the second oscillating range is individually increased wider than each of the backlashes between the pinion gears and the sun gear within the first oscillating range, and each of the backlashes between the pinion gears and the ring gear within the first oscillating range. According to the exemplary embodiment of the present disclosure, therefore, engagement between teeth of each of the pinion gears and teeth of the sun gear is delayed and loosened within the second oscillating range. That is, torque transmitting efficiency between the pinion gears and the sun gear or the ring gear is reduced within the second oscillating range. Especially, when the engine 2 is operated at a high speed, magnitude of pulsation of the engine torque as a vibratory force is small, vibrations transmitted from the input element to the output element are very little or none. In this situation, even if the inertia torque is generated by the oscillation of the inertia element, the inertia torque transmitted to the output element is very little or none. That is, in a vehicle on which the torsional vibration damper according to the exemplary embodiment of the present disclosure is mounted, kinetic momenta of rotary members connected to the engine and an output shaft of the engine are increased when a vehicle speed is high. Consequently, the pulsation of the engine is smoothened, that is, the vibratory force of the engine torque is reduced, and the inertia moment derived from an oscillating motion of the inertia element may overwhelm the vibratory force of the engine torque to generate vibrations. In the torsional vibration damper according to the exemplary embodiment of the present disclosure, however, the torque transmitting efficiency is reduced within the second oscillating range at which the pinion gear is situated when the vehicle speed is high. For this reason, the vibrations will not be transmitted from the input element to the output element at the high speed range. That is, the vibration damping performance of the torsional vibration damper according to the exemplary embodiment of the present disclosure will not be reduced even in the high speed range.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Figure 1:
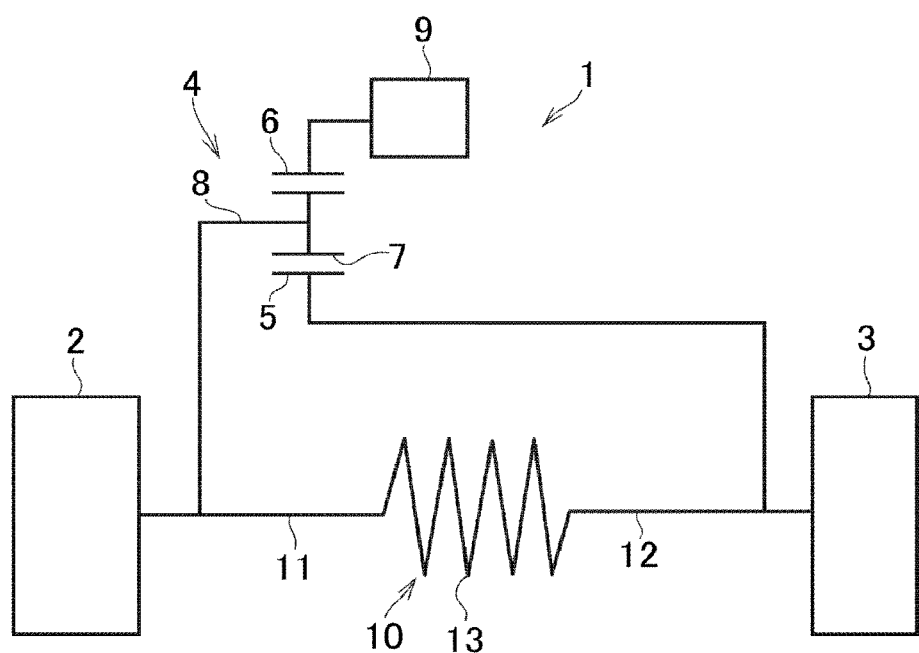
FIG. 1 is a schematic illustration showing a structure of a torsional vibration damper according to the exemplary embodiment of the present disclosure.
Figure 2:
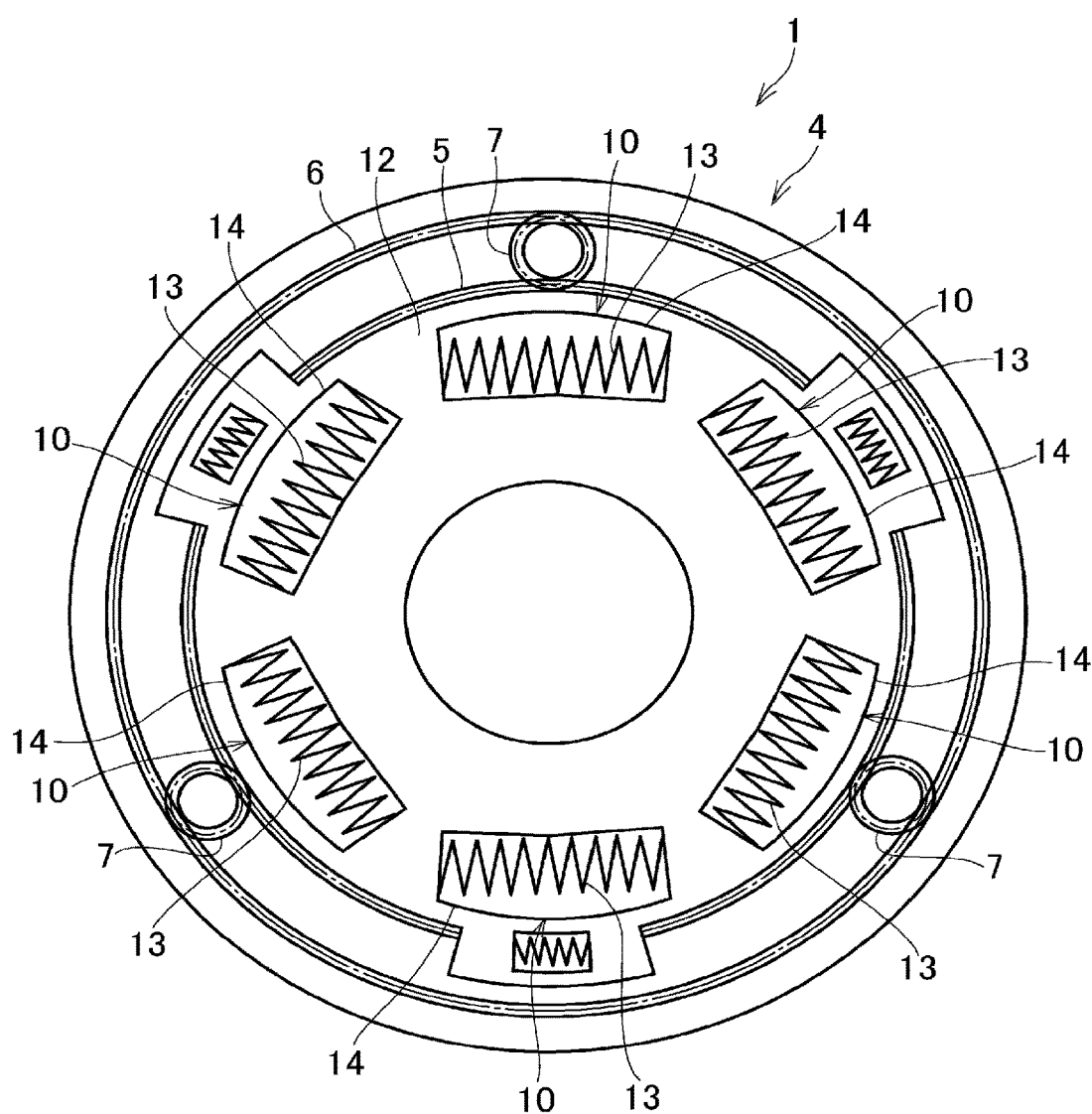
FIG. 2 is a front view showing one example of a structure of the torsional vibration damper according to the embodiment of the present disclosure.

An exemplary embodiment of the present disclosure will now be explained with reference to the accompanying drawings. Referring now to FIG. 1 and FIG. 2, there are shown one example of a structure of a torsional vibration damper 1 according to the exemplary embodiment of the present disclosure. As illustrated in FIG. 1, the torsional vibration damper 1 is disposed on a torque transmission path between a prime mover 2 and a drive object 3 so as to deliver a torque generated by the prime mover 2 to the drive object 3 while reducing vibrations resulting from pulsation of the torque generated by the prime mover 2. For example, an internal combustion engine such as a gasoline engine and a diesel engine may be adopted as the prime mover (as will be called the "engine" hereinafter) 2 of an automobile, and an output torque of the engine 2 pulsates inevitably. A torque of the engine 2 is increased with an increase in a speed of the engine 2, but reduced after the speed of the engine 2 is raised higher than a level at which the torque of the engine 2 is increased to a maximum magnitude. As a result of increasing the speed of the engine 2, kinetic forces of rotary members connected to e.g., an output shaft of the engine 2 are increased so that the pulsation of the torque of the engine 2 is reduced. Likewise, when the speed of the engine 2 exceeds the level at which the torque of the engine 2 is increased to the maximum magnitude, the pulsation of the torque of the engine 2 is reduced. According to the exemplary embodiment of the present disclosure, the drive object (as will be called the "transmission" hereinafter) 3 is a conventional transmission such as a geared transmission in which a speed ratio varies stepwise, and a continuously variable transmission in which a speed ratio varies continuously.

The torsional vibration damper 1 comprises a single-pinion type planetary gear unit 4 that is connected to the output shaft of the engine 2 in a torque transmittable manner. The planetary gear unit 4 is adapted to perform a differential action among: a sun gear 5; a ring gear 6 arranged concentrically with the sun gear 5; and a carrier 8 rotatably supporting pinion gears 7 interposed between the sun gear 5 and the ring gear 6. In the planetary gear unit 4, the carrier 8 is connected to the output shaft of the engine 2, the sun gear 5 is connected to the transmission 3, and the ring gear 6 is formed integrally with an inertial mass 9. The inertial mass 9 may also be formed separately from the ring gear 6 and attached to the ring gear 6 to be rotated integrally therewith. As explained later, an inertia torque established by rotating the ring gear 6 together with the inertial mass 9 acts as a vibration suppression torque to suppress vibrations resulting from pulsation of the engine torque. In the torsional vibration damper 1 according to the exemplary embodiment of the present disclosure, the carrier 8 serves as an input element, the sun gear 5 serves as an output element, and the ring gear 6 serves as an inertia element.

The sun gear 5 and the carrier 8 are connected through a spring damper 10 serving as an elastic body in the torsional vibration damper 1 according to the exemplary embodiment of the present disclosure. The spring damper 10 comprises, a drive member 11 disposed upstream in a direction to transmit the torque of the engine 2, a driven member 12 disposed downstream in the direction to transmit the torque of the engine 2, and a coil spring 13 connecting the drive member 11 to the driven member 12 while allowing the drive member 11 and the driven member 12 to rotate relatively to each other. Specifically, a plurality of apertures 14 are formed on the drive member 11 and the driven member 12 respectively. The apertures 14 of the drive member 11 and the apertures 14 of the driven member 12 are overlapped on each other to form spring holders, and the coil spring 13 is held in each of the spring holders. The coil springs 13 held in the spring holders are compressed and elongated by a relative rotation between the drive member 11 and the driven member 12. The drive member 11 is integrated with the carrier 8, and the sun gear 5 is formed around the driven member 12. That is, as illustrated in FIG. 2, the spring damper 10 is arranged concentrically inside of the planetary gear unit 4 while being overlapped with the planetary gear unit 4 at least partially in a radial direction.

Here will be explained a rotational angle of the carrier 8 with respect to the sun gear 5, that is, a position of each of the pinion gears 7, depending on a magnitude of the engine torque applied to the torsional vibration damper 1. As described, the carrier 8 is connected to the engine 2 and the sun gear 5 is connected to the transmission 3, therefore, an inertia moment of the transmission 3 acts as a reaction against the engine torque. As a result, the coil springs 13 are compressed by a compressive load derived from the torque of the engine 2 and the inertia moment of the transmission 3, and the sun gear 5 and the carrier 8 are rotated relatively to each other in accordance with deformation amounts of the coil springs 13. Accordingly, the torque to cause a relative rotation between the sun gear 5 and the carrier 8 corresponds to a "torsional torque" in the exemplary embodiment of the present disclosure. Specifically, the torsional torque is increased with an increase in the engine torque, and consequently, a rotational angle of the carrier 8 with respect to the sun gear 5 is increased. By contrast, the torsional torque is reduced with a reduction in the engine torque, and consequently, a rotational angle of the carrier 8 with respect to the sun gear 5 is reduced. Thus, in the torsional vibration damper 1, a relative rotation between the sun gear 5 and the carrier 8 is caused by the torsional torque, and positions and oscillating ranges of the pinion gears 7 around the sun gear 5 are changed depending on a magnitude to the torsional torque.

Figure 3:
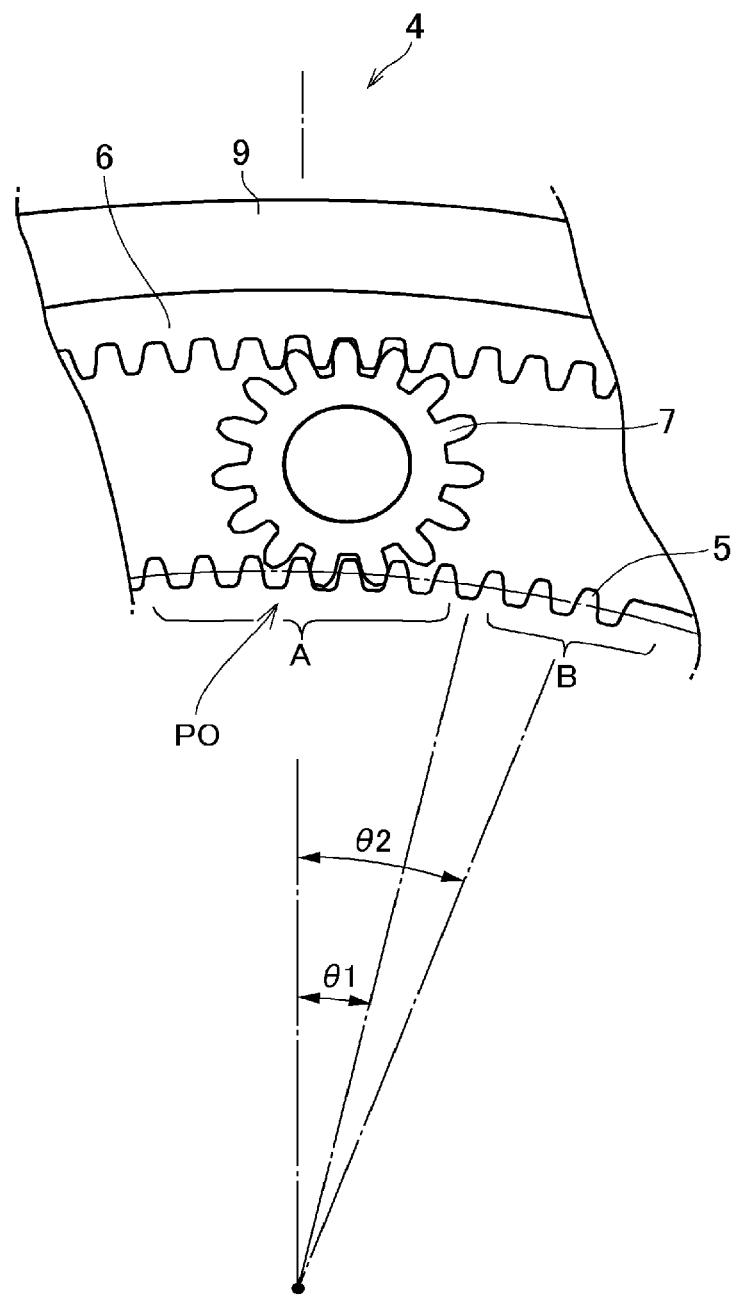
FIG. 3 is a partial enlarged view showing an oscillating range of a pinion gear when an engine torque is large, and an oscillating range of the pinion gear when the engine torque is small.

Turning to FIG. 3, there is shown an oscillating range of the pinion gear 7 around the sun gear 5 in a case that a magnitude of the torsional torque is large, and an oscillating range of the pinion gear 7 around the sun gear 5 in a case that a magnitude of the torsional torque is small. As described, a torque of the engine 2 is increased with an increase in a speed of the engine 2 until the speed of the engine 2 is raised to the level at which the torque of the engine 2 is increased to the maximum magnitude. That is, when the engine 2 is operated at a high speed so that the torque of the engine 2 is increased, the torsional torque is increased. In FIG. 3, P0 represents an initial position of the pinion gear 7 at which the pinion gear 7 is situated when the relative rotation (or torsion) between the carrier 8 as the input element and a sun gear 5 as the output element is not caused. In other words, P0 is the initial position of the pinion gear 7 where the pinion gear 7 is positioned when the aperture 14 of the drive member 11 and the aperture 14 of the driven member 12 are overlapped on each other without compressing the coil spring 13. As indicated in FIG. 3, a rotational angle θ2 of the pinion gear 7 from the initial position P0 of the case in which a magnitude of the torsional torque is large is wider than a rotational angle θ1 of the pinion gear 7 from the initial position P0 of the case in which the magnitude of the torsional torque is small. That is, when the magnitude of the torsional torque is large, the pinion gear 7 oscillates within a second oscillating range B, and when the magnitude of the torsional torque is small, the pinion gear 7 oscillates within a first oscillating range A. As can be seen from FIG. 3, the second oscillating range B is located ahead of the first oscillating range A in a rotational direction of the carrier 8. As described, when the torque of the engine 2 is large, and a speed of the engine 2 is high or a kinetic momentum of the engine 2 is large, an amplitude of pulsation of the engine torque or a vibratory force of the engine 2 is small. By contrast, when the torque of the engine 2 is small, and a speed of the engine 2 is low or a kinetic momentum of the engine 2 is small, an amplitude of pulsation of the engine torque or a vibratory force of the engine 2 is large. Therefore, the second oscillating range B is narrower than the first oscillating range A.

As described, when the engine 2 is operated at the high speed range, pulsation of the torque of the engine 2 is smoothened, and hence the vibratory force (or an exciting force) of the engine 2 is reduced. Consequently, the inertia torque of the ring gear 6 integrated with the inertial mass 9 will exceed the vibratory force of the engine 2. In this situation, therefore, the inertia torque of the ring gear 6 integrated with the inertial mass 9 itself may cause vibrations. That is, the vibration damping performance of the torsional vibration damper 1 may be reduced. In order to prevent such reduction in the vibration damping performance of the torsional vibration damper 1, according to the exemplary embodiment of the present disclosure, a torque transmission efficiency among the rotary elements of the planetary gear unit 4 within the second oscillating range B is reduced. Specifically, each backlash between the pinion gear 7 and the sun gear 5 within the second oscillating range B is individually increased wider than each backlash between the pinion gear 7 and the sun gear 5 within the first oscillating range A, or each backlash between the pinion gear 7 and the ring gear 6 within the second oscillating range B is individually increased wider than each backlash between the pinion gear 7 and the ring gear 6 within the first oscillating range A. Instead, each backlash between the pinion gear 7 and the sun gear 5 within the second oscillating range B and each backlash between the pinion gear 7 and the ring gear 6 within the second oscillating range B may also be increased wider than those within the first oscillating range A. For example, the backlash between the gears may be adjusted by altering a tooth thickness of at least one of the gears, or by altering a space thickness between teeth of at least one of the gears.

Figure 4A:
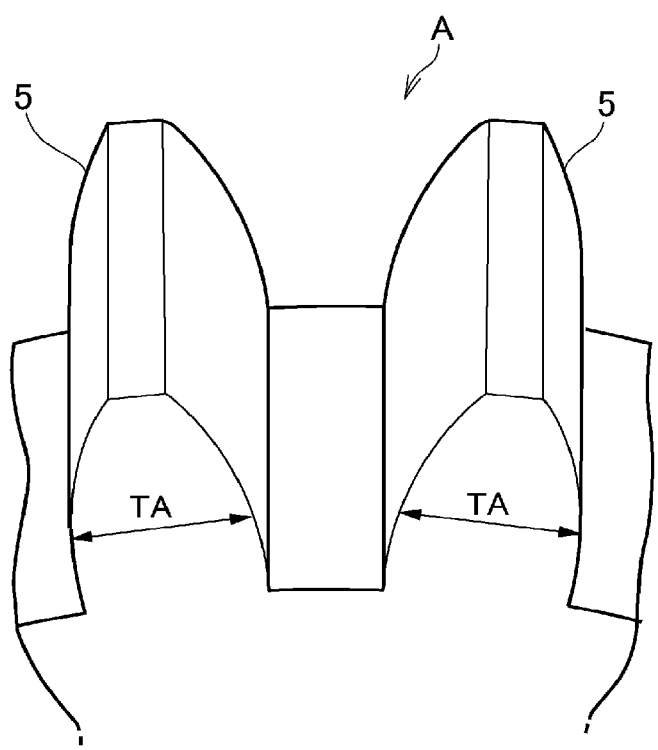
FIG. 4A is a partial enlarged view showing a circular thickness of a tooth of the sun gear within a first region.
Figure 4B:
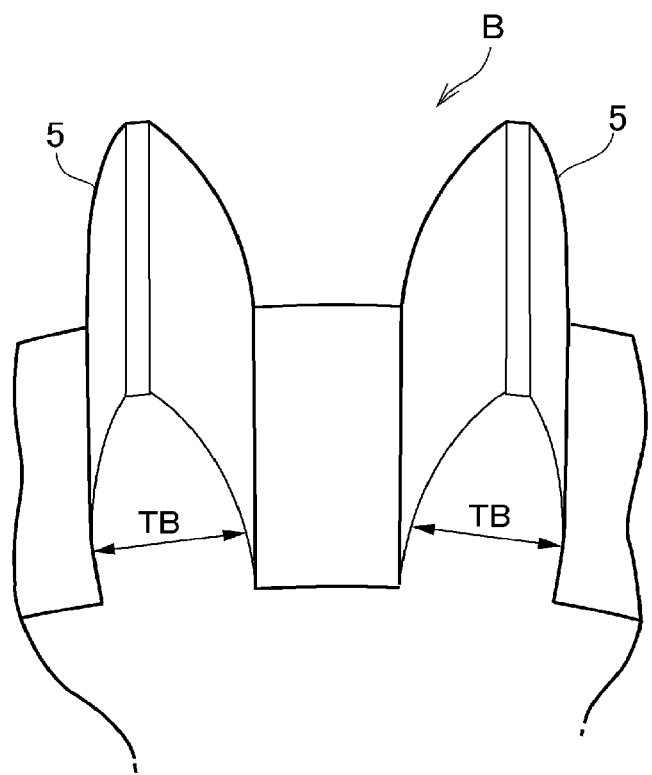
FIG. 4B is a partial enlarged view showing a circular thickness of a tooth of the sun gear within a second region.

According to the exemplary embodiment of the present disclosure, the tooth thickness of the teeth of the sun gear 5 is adjusted to reduce the torque transmission efficiency of the planetary gear unit 4 within the second oscillating range B. The tooth thickness TA of each tooth of the sun gear 5 within each of the first oscillating ranges A is shown in FIG. 4A, and the tooth thickness TB of each tooth of the sun gear 5 within each of the second oscillating ranges B is shown in FIG. 4B. As can be seen from FIGS. 4A and 4B, the tooth thickness TB of each tooth of the sun gear 5 within the second oscillating range B is individually reduced thinner than the tooth thickness TA of each tooth of the sun gear 5 within the first oscillating range A. That is, the backlash between the pinion gear 7 and the sun gear 5 within each of the second oscillating ranges B is individually increased wider than the backlash between the pinion gear 7 and the sun gear 5 within each of the first oscillating ranges A. According to the exemplary embodiment of the present disclosure, therefore, the torque transmission efficiency of the planetary gear unit 4 is reduced when each of the planetary gears 7 is oscillated within the second oscillating range B respectively, compared to the torque transmission efficiency of the case in which each of the planetary gears 7 is oscillated within each of the first oscillating ranges A. Instead, the backlash between the pinion gear 7 and e.g., the sun gear 5 may also be increased by increasing the space thickness between the teeth of at least one of the pinion gear 7 and e.g., the sun gear 5.

Next, here will be explained an action of the torsional vibration damper 1 according to the exemplary embodiment of the present disclosure. The torque generated by the engine 2 is applied to the carrier 8, and a reaction torque resulting from rotating the transmission 3 is applied to the sun gear 5. Consequently, the drive member 11 integrated with the carrier 8 and the driven member 12 on which the sun gear 5 is formed are rotated relatively to each other. In this situation, the coil springs 13 held in the spring holders are compressed respectively by a relative displacement of the apertures 14 of the drive member 11 and the apertures 14 of the driven member 12. Specifically, an angle of the relative rotation between the carrier 8 and the sun gear 5 is governed by a magnitude of the torsional torque resulting from rotating the transmission 3. For example, when the engine 2 is operated at a low speed, the torque of the engine 2 is small. That is, the torsional torque compressing the coil springs 13 is also small so that the angle of the relative rotation between the carrier 8 and the sun gear 5 is small. In this case, therefore, each of the pinion gears 7 is individually positioned within the first oscillating range A.

In this situation, a compression force applied to each of the coil springs 13 is changed repeatedly by a pulsation of the torque of the engine 2, and the carrier 8 and the sun gear 5 are oscillated relatively to each other by such change in the compression force. Consequently, the coil springs 13 are compressed and expanded repeatedly, and each of the pinion gears 7 is oscillated within the first oscillating range A. In this situation, the ring gear 6 is also rotated relatively to the carrier 8 and the sun gear 5 while being oscillated. In the planetary gear unit 4, a rotational speed of the ring gear 6 is increased higher than a rotational speed of the sun gear 5 in accordance with a gear ratio of the planetary gear unit 4. In this situation, therefore, an angular velocity of the ring gear 6 is increased so that an inertia torque established by the ring gear 21 integrated with the inertial mass 9 is increased. Specifically, the ring gear 6 is oscillated out of phase with the pulsation of the torque of the engine 2 applied to the carrier 8. Therefore, the pulsation of the torque of the engine 2 is damped by the inertia torque established by the ring gear 6 so that the torque of the engine 2 is delivered to the transmission 3 while being smoothened.

The angular velocity of the ring gear 6 is increased with an increase in the speed of the engine 2, and the inertia torque of the ring gear 6 integrated with the inertial mass 9 is increased with an increase in the angular velocity thereof. When a magnitude of the pulsation of the engine torque (i.e., vibratory force or exciting force) delivered to the driven member 12 through the spring damper 10 becomes equal to a magnitude of the inertia torque of the ring gear 6, a vibration level in the transmission 3 is lowered to the lowest level. A speed of the engine 2 at which the vibration level in the transmission 3 is lowered to the lowest level (as will be called the "first speed" hereinafter) may be set during the design phase. In the exemplary embodiment of the present disclosure, an output torque of the spring damper 10 of a case in which the engine 2 is operated at the first speed will be called the "first reference torque".

Figure 5:
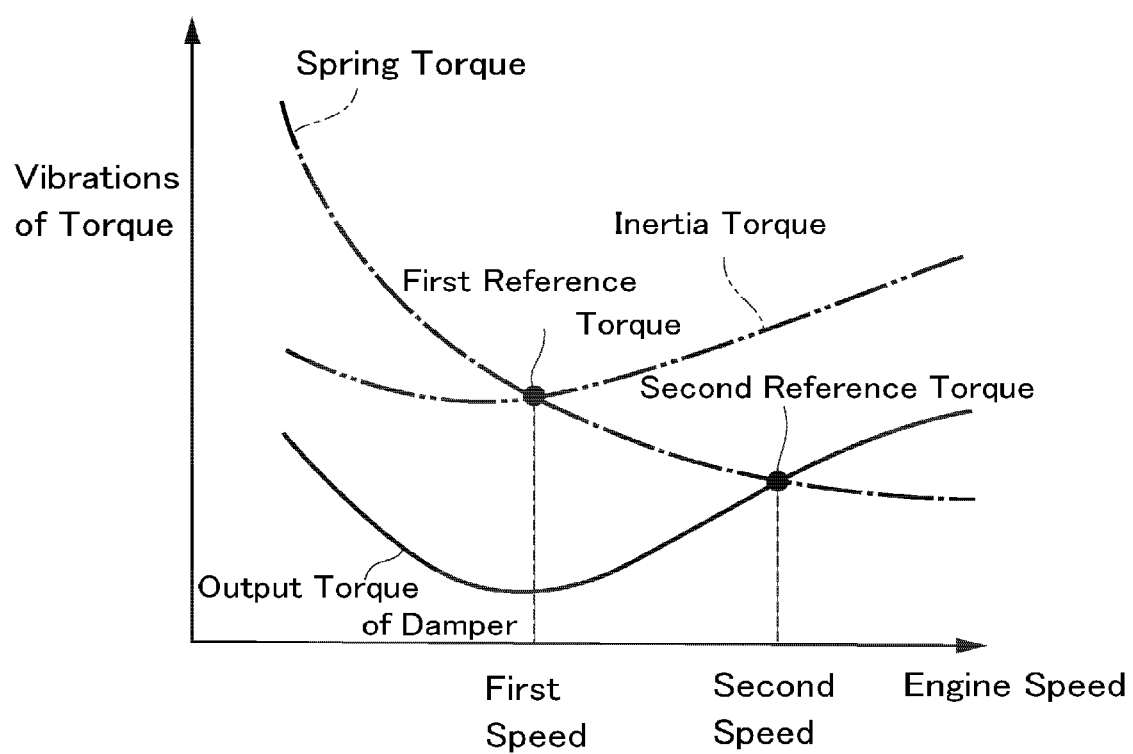
FIG. 5 is a graph indicating vibrations of torques with respect to a speed of an engine.

Here will be explained the vibrations generated by the inertia torque of the ring gear 6 integrated with the inertial mass 9, vibrations outputted from the torsional vibration damper 1, and vibrations outputted from the spring damper 10, with reference to FIG. 5. In the spring damper 10, the vibrations generated by the pulsation of the engine torque delivered thereto are absorbed by the compression and the expansion of each of the coil springs 13. Kinetic momenta of the rotary members connected to the engine 2 and the output shaft of the engine 2 are increased with an increase in the speed of the engine 2, therefore, the vibrations generated by the pulsation of the torque of the engine 2 is reduced with an increase in the speed of the engine 2. Consequently, as indicated by the dashed-dotted curve in FIG. 5, the vibrations of the output torque from the spring damper 10 (as will be called the "spring torque" hereinafter) is reduced gradually with an increase in the speed of the engine 2. Since the vibrations of the spring torque is generated by the compression and expansion of the coil springs 13, the vibrations of the spring torque are out of phase with the vibrations of the inertia torque of the ring gear 9 integrated with the inertial mass 9. As described, the inertia torque is increased with an increase in the angular velocity of the ring gear 6 resulting from an increase in the speed of the engine 2. Therefore, as indicated by the dashed-two-dotted curve in FIG. 5, the vibrations of the inertia torque are increased with an increase in the speed of the engine 2.

As described, the speed at which the magnitude of the vibrations of the inertia torque and the magnitude of the vibrations of the spring torque are equalized to each other is the above-mentioned first speed. When the engine 2 is operated at the first speed, as indicated by the solid curve, the magnitude of the vibrations of the output torque of the torsional vibration damper 1 is reduced to the minimum level. The vibrations of the output torque of the torsional vibration damper 1 is increased with an increase in the inertia torque resulting from an increase in the speed of the engine 2 from the first speed. In the exemplary embodiment of the present disclosure, a speed of the engine 2 at which the magnitude of the vibrations of the spring torque and the magnitude of the output torque of the torsional vibration damper 1 are equalized to each other will be called the "second speed", and an output torque of the spring damper 10 of a case in which the engine 2 is operated at the second speed will be called the "second reference torque".

When a rotational angle of the carrier 8 with respect to the sun gear 5 is increased while the torque of the engine 2 is increased with an increase in the speed of the engine 2, each of the pinion gears 7 is individually moved from the first oscillating range A to the second oscillating range B, and oscillated within the second oscillating range B by the pulsation of the torque of the engine 2. As described, in the torsional vibration damper 1 according to the exemplary embodiment of the present disclosure, each backlash between the pinion gear 7 and e.g., the sun gear 5 in the second oscillating range B is individually wider than each backlash between the pinion gear 7 and the sun gear 5 in the first oscillating range A. Therefore, when each of the pinion gears 7 is oscillated within the second oscillating range B, engagement between the teeth of each of the pinion gears 7 and the teeth of the sun gear 5 is loosened. That is, the torque transmitting efficiency from the pinion gears 7 supported by the carrier 8 as the input element to the sun gear 5 is reduced. In this situation, even if the inertia torque is generated by the oscillation of the ring gear 6 integrated with the inertial mass 9, the inertia torque transmitted to the sun gear 5 is very little or none. Since the torque transmitting efficiency within the second oscillating range B is thus reduced, the vibration damping performance the torsional vibration damper 1 will not be reduced even if the engine 2 is operated at a high speed. As can be seen from FIG. 5, the vibrations of the inertia torque are increased with an increase in the speed of the engine 2 from the first speed. When the engine 2 is operated at a speed higher than the first speed, each of the pinion gears 7 are individually displaced to the second oscillating range B. Therefore, it is preferable to set a boundary between the first oscillating range A and the second oscillating range B further than a point at which the pinion gear 7 is situated given that the engine 2 is operated at the first speed at which the vibrations of the spring torque becomes the first reference torque matching with the vibrations of the inertia torque. In addition, the vibrations of the output torque of the torsional vibration damper 1 is increased greater than the vibrations of the spring torque with an increase in the speed of the engine 2 from the second speed. That is, the vibration damping performance of the torsional vibration damper 1 is reduced when the speed of the engine 2 is higher than the second speed. Therefore, the vibrations of the output torque of the torsional vibration damper 1 can be damped certainly by setting the boundary between the first oscillating range A and the second oscillating range B closer to the initial position of the pinion gear 7 than a point at which the pinion gear 7 is situated given that the engine 2 is operated at the second speed. For these reasons, it is preferable to set a boundary between the first oscillating range A and the second oscillating range B between: the point at which the pinion gear 7 is situated when the spring torque becomes the first reference torque; and the point at which the pinion gear 7 is situated when the spring torque becomes the second reference torque. In other words, the reference torque falls within a range from a value greater than the first reference torque to a value smaller than the second reference torque.

When a torque greater than a torque to compress the coil spring 13 completely is applied to the torsional vibration damper 1, the relative rotation between the drive member 11 and the driven member 12 is restricted by a stopper (not shown). In this situation, therefore, the spring damper 10 is rotated integrally thereby rotating the planetary gear unit 4 integrally. Consequently, the engine torque delivered to the torsional vibration damper 1 is further delivered to the transmission 3 as it is.

Although the above exemplary embodiment of the present disclosure has been described, it will be understood by those skilled in the art that the present disclosure should not be limited to the described exemplary embodiment, and various changes and modifications can be made within the scope of the present disclosure. For example, each backlash between the pinion gear 7 and the ring gear 6 in the second oscillating range B may also be increased wider than each backlash between the pinion gear 7 and the ring gear 6 in the first oscillating range A so as to achieve the above-explained advantages. In addition, both of the backlashes between the pinion gears 7 and the sun gear 5 and the backlashes between the pinion gears 7 and the ring gear 6 in the second oscillating range B may also be increased wider than those in the first oscillating range A. In this case, in the second oscillating range B, not only the torque transmitting efficiency between the pinion gear 7 and the sun gear 5 but also the torque transmitting efficiency between the pinion gear 7 and the ring gear 6 are reduced. For this reason, even if the inertia torque is generated by the oscillation of the ring gear 6 integrated with the inertial mass 9, the inertia torque transmitted to the sun gear 5 can be further reduced to ensure the vibrating damping performance of the torsional vibration damper 1 in the high speed range.

What is claimed is:

1. A torsional vibration damper, comprising:
    a planetary gear unit that performs a differential action among
        a sun gear,
        a ring gear arranged concentrically around the sun gear, and
        a carrier supporting a plurality of pinion gears interposed between the sun gear and the ring gear in a rotatable manner,
    wherein one of the sun gear, the ring gear, and the carrier serves as an input element to which a torque is delivered from an engine,
    another one of the sun gear, the ring gear, and the carrier serves as an output element that outputs the torque,
    still another one of the sun gear, the ring gear, and the carrier serves as an inertia element that is rotated relatively to the input element and the output element by an inertia force,
    an elastic member is interposed between the input element and the output element to be deformed elastically by a torsional torque causing a relative rotation between the input element and the output element, and
    each of the pinion gears is individually moved from an initial position when the relative rotation between the input element and the output element is caused by the torsional torque, and individually oscillated by a pulsation of the torque delivered to the input element from the engine,
    each of the pinion gears is individually oscillated within a first oscillating range when the torsional torque is smaller than a reference torque,
    each of the pinion gears is individually oscillated within a second oscillating range when the torsional torque is greater than the reference torque, and
    each backlash between the pinion gears and at least one of the sun gear and the ring gear within the second oscillating range is individually wider than each backlash between the pinion gears and the sun gear within the first oscillating range, and each backlash between the pinion gears and the ring gear within the first oscillating range.

2. The torsional vibration damper as claimed in claim 1, wherein the second oscillating range is located ahead of the first oscillating range in a rotational direction of the carrier.

3. The torsional vibration damper as claimed in claim 1, wherein each of the backlashes between the pinion gears and the sun gear within the second oscillating range is individually wider than each of the backlashes between the pinion gears and the sun gear within the first oscillating range, and each of the backlashes between the pinion gears and the ring gear within the first oscillating range.

4. The torsional vibration damper as claimed in claim 1, wherein each of the backlashes between the pinion gears and the ring gear within the second oscillating range is individually wider than each of the backlashes between the pinion gears and the sun gear within the first oscillating range, and each of the backlashes between the pinion gears and the ring gear within the first oscillating range.

5. The torsional vibration damper as claimed in claim 1, wherein each of the backlashes between the pinion gears and the sun gear within the second oscillating range and each of the backlashes between the pinion gears and the ring gear within the second oscillating range are individually wider than each of the backlashes between the pinion gears and the sun gear within the first oscillating range, and each of the backlashes between the pinion gears and the ring gear within the first oscillating range.

6. The torsional vibration damper as claimed in claim 1,
   wherein the reference torque is greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

7. The torsional vibration damper as claimed in claim 2,
   wherein the reference torque is greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

8. The torsional vibration damper as claimed in claim 3,
   wherein the reference torque is greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

9. The torsional vibration damper as claimed in claim 4,
   wherein the reference torque is greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

10. The torsional vibration damper as claimed in claim 5,
    wherein the reference torque is greater than a first reference torque at which magnitude of vibrations of a spring torque delivered from the input element to the output element through the elastic member is equalized to magnitude of vibrations of an inertia torque of the inertia element, but smaller than a second reference torque at which the magnitude of the vibrations of the spring torque is equalized to magnitude of vibrations of the torque of the output element.

* * * * *